United States Patent
Chiang et al.

(10) Patent No.: US 8,948,703 B2
(45) Date of Patent: Feb. 3, 2015

(54) EVALUATION DEVICE AND METHOD FOR PROVIDING A TRANSCEIVER SYSTEM WITH PERFORMANCE INFORMATION THEREOF

(75) Inventors: Ching-Tai Chiang, Dashu Township (TW); Rong-Ching Wu, Dashu Township (TW); Chen-Sen Ouyang, Dashu Township (TW); Jong-Ian Tsai, Dashu Township (TW)

(73) Assignee: I-Shou University, Kaohsiung (TW)

( * ) Notice: Subject to any disclaimer, the term of this patent is extended or adjusted under 35 U.S.C. 154(b) by 1065 days.

(21) Appl. No.: 12/952,699

(22) Filed: Nov. 23, 2010

(65) Prior Publication Data
US 2012/0129466 A1    May 24, 2012

(51) Int. Cl.
*H04B 17/00* (2006.01)

(52) U.S. Cl.
CPC .................................. *H04B 17/006* (2013.01)
USPC ......................... 455/67.13; 455/17; 455/464

(58) Field of Classification Search
CPC ............... H01Q 1/243; H04B 17/006
USPC ........................ 455/67.13, 464, 17
See application file for complete search history.

(56) References Cited

U.S. PATENT DOCUMENTS

2003/0045307 A1*  3/2003  Arviv et al. .................. 455/464

* cited by examiner

*Primary Examiner* — Hsin-Chun Liao
(74) *Attorney, Agent, or Firm* — Jianq Chyun IP Office (57) ABSTRACT

An evaluation device is adapted for providing a transceiver system with performance information thereof. The transceiver system models a channel between a transmitter and a receiver thereof using Nakagami distribution with a fading parameter. The evaluation device includes a signal-to-noise ratio (SNR) computing module, a capacity computing module, and an output module. The SNR computing module is operable to set an average SNR for the channel between the transmitter and the receiver, and to compute an expected value and variance of an effective SNR of the transceiver system according to the fading parameter and the average SNR. The capacity computing module is operable to compute an outage capacity of the transceiver system based upon the expected value and the variance of the effective SNR and a transmission outage parameter. The output module is operable to provide the transceiver system with the average SNR and the outage capacity.

12 Claims, 8 Drawing Sheets

EVALUATION DEVICE AND METHOD FOR PROVIDING A TRANSCEIVER SYSTEM WITH PERFORMANCE INFORMATION THEREOF

BACKGROUND OF THE INVENTION

1. Field of the Invention

The present invention relates to an evaluation device and method for providing a transceiver system with performance information thereof, more particularly to an evaluation device and method for providing a transceiver system, which models a channel thereof using Nakagami distribution, with performance information thereof.

2. Description of the Related Art

Figure 1:
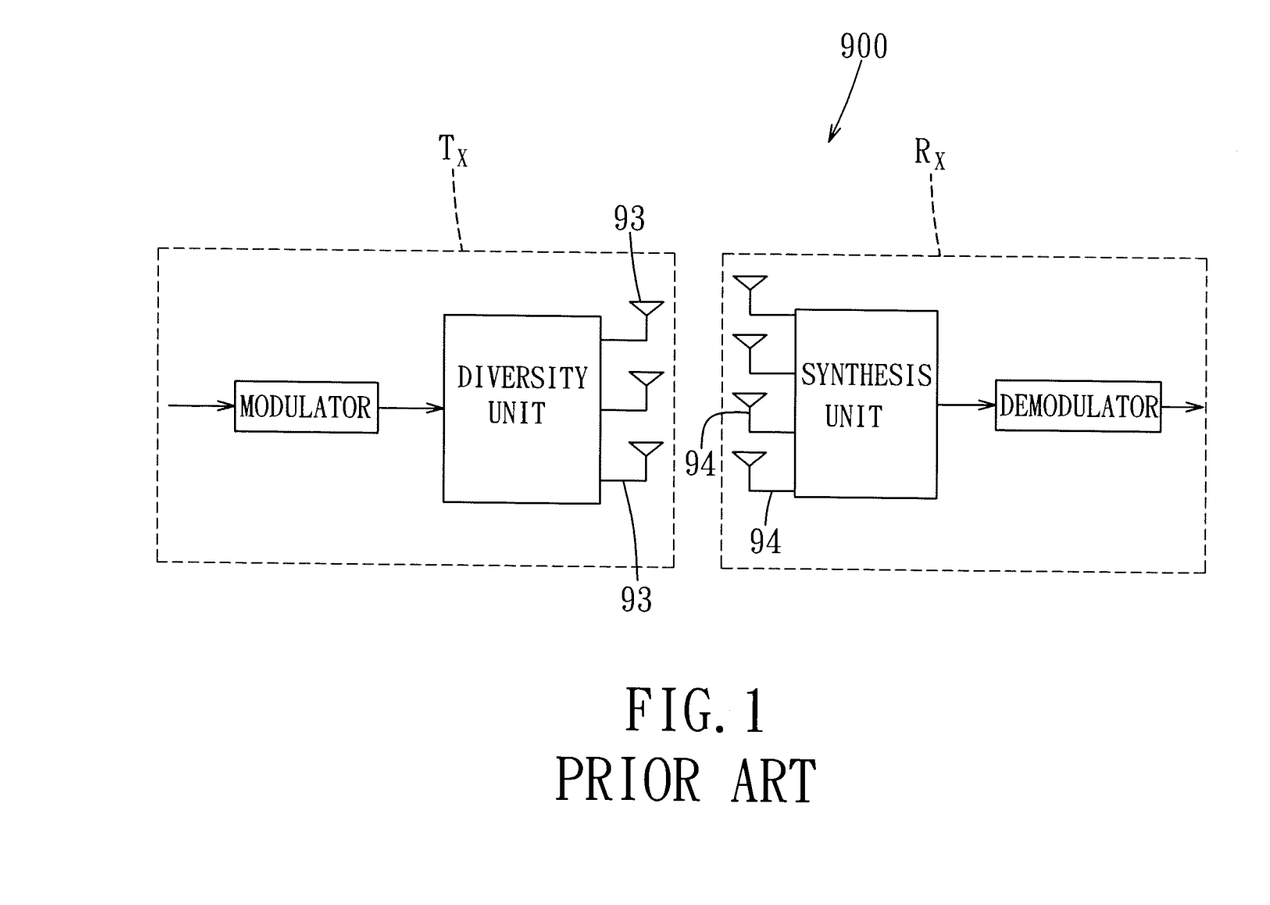
FIG. 1 is a block diagram illustrating a conventional transceiver system.

Referring to FIG. 1, a multiuser transceiver system 900 under a transmit antenna selection/maximal-ratio combining (TAS/MRC) scheme includes a transmitter (Tx) and a receiver (Rx). The transmitter (Tx) includes a plurality of transmit antennas 93, and the receiver (Rx) includes a plurality of receive antennas 94. The receiver (Rx) is operable, in advance, to estimate the channels between the transmitter (Tx) and itself so as to determine which one of the transmit antennas 93 results in a channel that has relatively better performance. According to the evaluation results from the receiver (Rx), the transmitter (Tx) is operable to communicate with the receiver (Rx), and to transmit signals to the receiver (Rx) using one of the transmit antennas 93 corresponding to one of the channels that has relatively better performance. Then, the receiver (Rx) is operable to weight the signals received by the receive antennas 94 thereof so as to optimize the performance of the transceiver system 900.

In "Outage capacity analysis of multiuser diversity in MIMO antenna selection systems," IEEE PIMRC' 2007, September 2007, pages 1-5, X. Zhang et al. proposed a method for evaluating performance of a transceiver system under the TAS/MRC scheme by using Rayleigh fading channels (see FIG. 2) to simulate an outage capacity. However, the Rayleigh fading channels are only appropriate for simulation of fading simply caused by multipath transmission, and not appropriate for simulation of masking, fading, or other interferences in a metropolis.

SUMMARY OF THE INVENTION

Therefore, an object of the present invention is to provide an evaluation device and method adapted for appropriately evaluating performance of a transceiver system by using Nakagami channels to compute an outage capacity of the transceiver system.

Accordingly, an evaluation device of the present invention is adapted for providing a transceiver system with performance information thereof. The transceiver system includes a transmitter and a receiver, and models a channel between the transmitter and the receiver using Nakagami distribution with a fading parameter. The evaluation device comprises a signal-to-noise ratio (SNR) computing module, a capacity computing module, and an output module.

The SNR computing module is operable to set an average SNR for the channel between the transmitter and the receiver of the transceiver system, and to compute an expected value and variance of an effective SNR of the transceiver system according to the fading parameter and the average SNR. The capacity computing module is operable to compute an outage capacity of the transceiver system based upon the expected value and the variance of the effective SNR and a transmission outage parameter associated with a guaranteed transmission rate. The output module is operable to provide the transceiver system with the average SNR and the outage capacity as the performance information of the transceiver system.

According to another aspect, an evaluation method of this invention is adapted for providing a transceiver system with performance information thereof. The transceiver system includes a transmitter and a receiver, and models a channel between the transmitter and the receiver using Nakagami distribution with a fading parameter. The evaluation method is adapted to be implemented by an evaluation device, and comprises the steps of:

a) configuring the evaluation device to set an average SNR for the channel between the transmitter and the receiver of the transceiver system;

b) configuring the evaluation device to compute an expected value and variance of an effective SNR of the transceiver system according to the fading parameter and the average SNR;

c) configuring the evaluation device to compute an outage capacity of the transceiver system based upon the expected value and the variance of the effective SNR and a transmission outage parameter associated with a guaranteed transmission rate; and d) configuring the evaluation device to provide the transceiver system with the average SNR and the outage capacity as the performance information of the transceiver system.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
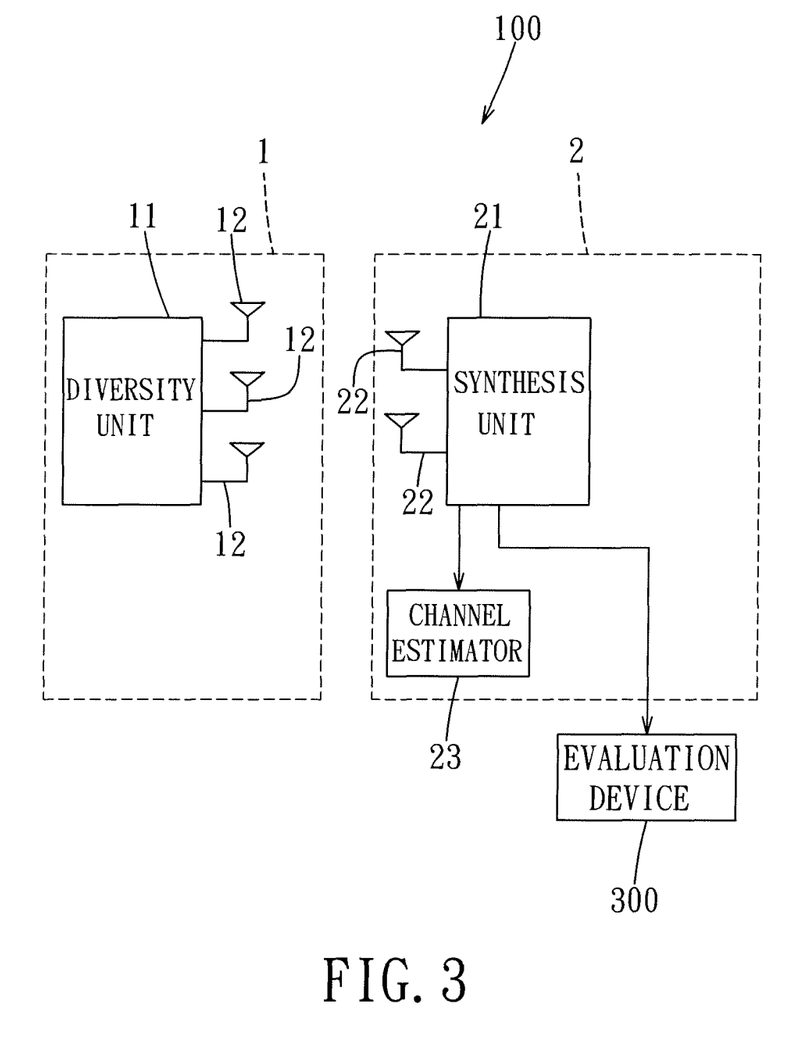
FIG. 3 is a block diagram of a transceiver system associated with the preferred embodiment of an evaluation device of this invention.

Referring to FIG. 3, a transceiver system 100 under a transmit antenna selection/maximal-ratio combining (TAS/MRC) scheme includes a transmitter 1 and a receiver 2. The transmitter 1 includes a diversity unit 11 and a number $L_T$ ($L_T>1$) of transmit antennas 12. The receiver 2 includes a number $L_R$ ($L_R>1$) of receive antennas 22, a synthesis unit 21, and a channel estimator 23. For illustrative purpose, in FIG. 3, the transmitter 1 includes three ($L_T=3$) of the transmit antennas 12, and the receiver 2 includes two ($L_R=2$) of the receive antennas 22.

In such a TAS/MRC scheme, there are a number $L_T \times L_R$ of possible channels each of which is defined by one of the transmit antennas 12 and one of the receive antennas 22. The channel estimator 23 of the receiver 2 is operable to provide the diversity unit 11 of the transmitter 1 with transmission qualities of the possible channels corresponding to the respective transmit antennas 12. Then, according to the transmission qualities, the diversity unit 11 of the transmitter 1 is operable to determine which one of the transmit antennas 12 will be used to transmit signals. The diversity unit 11 is further operable to transmit the signals to a selected one of the transmit antennas 12 for transmission of the signals to the receiver 2. After the receiver 2 receives the signals from the transmitter 1 through the receive antennas 22 thereof, the signals are transmitted to the synthesis unit 21. According to the transmission qualities of the channels between the selected one of the transmit antennas 12 and the receive antennas 22, the synthesis unit 21 is operable to weight the signals received by the receive antennas 22 so as to obtain a synthesized signal.

Figure 4:
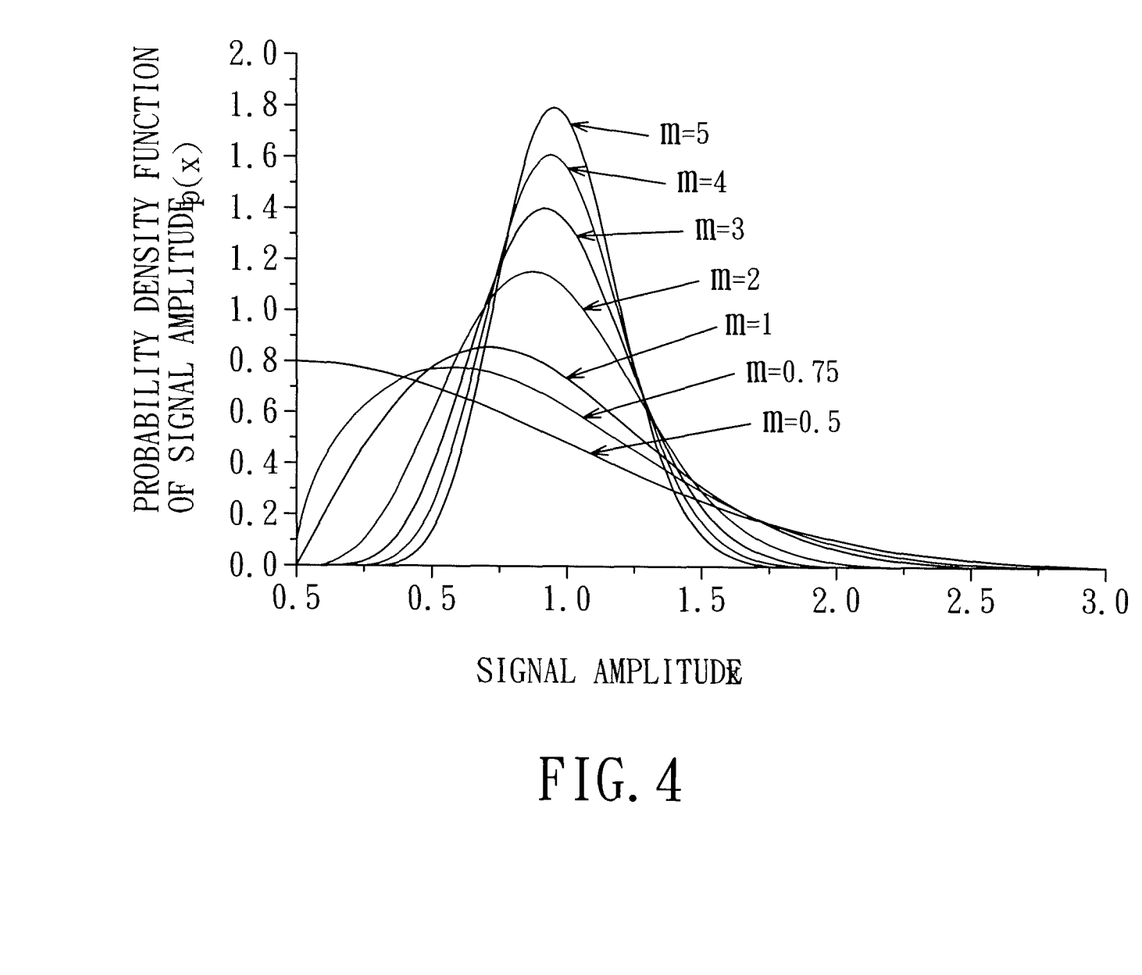
FIG. 4 is a plot to illustrate Nakagami distribution.

In "Analysis of transmit antenna select ion/maximal-ratio combining in Rayleigh fading channels," *IEEE Trans. Veh. Technol.*, Vol. 54, No. 4, pages 1312-1324, July 2005, Z. Chen et al. disclosed the use of Nakagami distribution (see FIG. 4) with a fading parameter m to model each of the channels between the selected one of the transmit antennas 12 and respective one of the receive antennas 22. The probability distribution of signal-to-noise ratios (SNR) of the synthesized signal may be expressed as Equation (1) using a probability density function (PDF) of SNR Q.

$$p(Q) = \frac{L_T}{[\Gamma(mL_R)]^{L_T}} \left(\frac{m}{\overline{Q}}\right)^{mL_R} Q^{mL_R-1} \exp\left(-\frac{mQ}{\overline{Q}}\right) \left[\gamma\left(mL_R, \frac{mQ}{\overline{Q}}\right)\right]^{L_T-1} \quad (1)$$

In Equation (1), $\overline{Q}$ is an average SNR of the channels, $\Gamma(z)$ is a Gamma function ($\Gamma(z) = \int_0^\infty t^{z-1} e^{-t} dt$) for an arbitrary positive number z, and $\gamma()$ is an incomplete Gamma function. The Gamma function $\Gamma(z)$ and the incomplete Gamma function $\gamma()$ may be respectively referred to Equations (8.310.1) and (8.350.1) in "*Table of Integrals, Series, and Products*" (Academic Press, New York, 1994, 5th edition).

Figure 2:
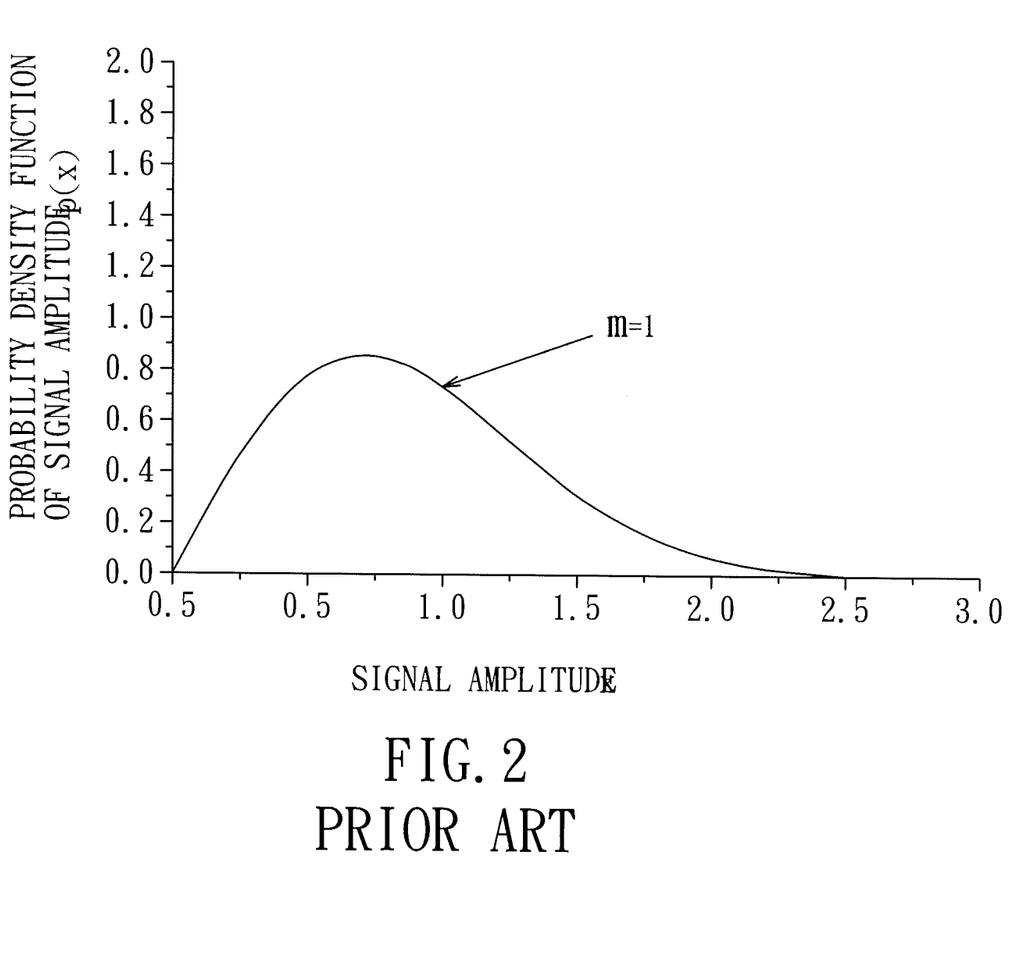
FIG. 2 is a plot to illustrate Rayleigh distribution.

It should be noted that the fading parameter m of Nakagami distribution shown in FIG. 4 may be an arbitrary positive number, and different values of the fading parameter m may correspond to different levels of channel fading. Compared with Rayleigh distribution that can be used only with the fading parameter m equal to 1 as shown in FIG. 2, Nakagami distribution is relatively appropriate for simulation in a metropolis.

Further, referring to Equations (8.352.1), (8.351.2), (9.14.1) and (0.314) in "*Table of Integrals, Series, and Products*," the term in $$\left[\gamma\left(mL_R, \frac{mQ}{\overline{Q}}\right)\right]^{KL_T-1}$$

Equation (1) can be represented by the following Equation (2) for the fading parameter m that is greater than or equal to ½, and Equation (3) for the fading parameter m that is a positive integer.

$$\left[\gamma\left(mL_R, \frac{mQ}{\overline{Q}}\right)\right]^{L_T-1} = \sum_{n=0}^{\infty} \alpha_n \left(\frac{mQ}{\overline{Q}}\right)^{mL_R(L_T-1)+n} \exp\left(-\frac{mQ(L_T-1)}{\overline{Q}}\right) \quad (2)$$

$$\left[\gamma\left(mL_R, \frac{mQ}{\overline{Q}}\right)\right]^{L_T-1} = [\Gamma(mL_R)]^{L_T-1} \cdot \sum_{j=0}^{L_T-1} \left\{\binom{L_T-1}{j}(-1)^j \exp\left(-j\frac{mQ}{\overline{Q}}\right) \sum_{n=0}^{j(mL_R-1)} \beta_n \left(\frac{mQ}{\overline{Q}}\right)^n\right\} \quad (3)$$

In Equations (2) and (3), $$\binom{L_T-1}{j} = \frac{(L_T-1)!}{j!(L_T-j-1)!},$$

$$\alpha_0 = \left(\frac{1}{mL_R}\right)^{L_T-1},$$

$$\alpha_n = \frac{\Gamma(mL_R+1)}{n} \sum_{j=1}^{n} \frac{jL_T - n}{\Gamma(mL_R+1+j)} \alpha_{n-j}$$

for a positive integer n, $\beta_0 = 1$, and $$\beta_t = \frac{1}{t} \sum_{k=1}^{\min(t, mL_R-1)} \frac{k(j+1) - t}{k!} \beta_{t-k}$$

for a positive integer t.

From Equation (2), when the fading parameter m is greater than or equal to ½, an expected value $\mu_Q$ and variance $\sigma_Q^2$ of an effective SNR of the transceiver system 100 can be expressed as Equations (4) and (5), respectively.

$$\mu_Q = \frac{(\overline{Q}/m)}{[\Gamma(mL_R)]^{L_T}} \sum_{n=0}^{\infty} \alpha_n \frac{\Gamma(mL_RL_T + n + 1)}{L_T^{mL_RL_T+n}} \quad (4)$$

$$\sigma_Q^2 = \frac{(\overline{Q}/m)^2}{[\Gamma(mL_R)]^{L_T}} \sum_{n=0}^{\infty} \alpha_n \frac{\Gamma(n + mL_RL_T + 2)}{L_T^{n+mL_RL_T+1}} - \left[\frac{(\overline{Q}/m)}{[\Gamma(mL_R)]^{L_T}} \sum_{n=0}^{\infty} \alpha_n \frac{\Gamma(mL_RL_T + n + 1)}{L_T^{mL_RL_T+n}}\right]^2 \quad (5)$$

From Equation (3), when the fading parameter m is a positive integer, the expected value $\mu_Q$ and variance $\sigma_Q^2$ of the effective SNR can be expressed as Equations (6) and (7), respectively.

$$\mu_Q = \frac{L_T(\overline{Q}/m)}{\Gamma(mL_R)} \sum_{j=0}^{L_T-1} \left[\binom{L_T-1}{j}(-1)^j \sum_{n=0}^{j(mL_R-1)} \beta_n \frac{\Gamma(mL_R + n + 1)}{(j+1)^{mL_R+n+1}}\right] \quad (6)$$

$$\sigma_Q^2 = \frac{L_T(\overline{Q}/m)^2}{\Gamma(mL_R)} \sum_{j=0}^{L_T-1} \left[\binom{L_T-1}{j}(-1)^j \sum_{n=0}^{j(mL_R-1)} \beta_n \frac{\Gamma(mL_R + n + 2)}{(j+1)^{mL_R+n+2}}\right] - \left\{\frac{L_T(\overline{Q}/m)}{\Gamma(mL_R)} \sum_{j=0}^{L_T-1} \left[\binom{L_T-1}{j}(-1)^j \sum_{n=0}^{j(mL_R-1)} \beta_n \frac{\Gamma(mL_R + n + 1)}{(j+1)^{mL_R+n+1}}\right]\right\}^2 \quad (7)$$

According to "Outage capacity analysis of multiuser diversity in MIMO antenna selection systems," *IEEE PIMRC'*

2007, pages 1-5, September 2007, proposed by X. Zhang et al., when the SNR of the synthesized signal is equal to Q, and the expected value and variance of the effective SNR are equal respectively to $\mu_Q$ and $\sigma_Q^2$, a channel capacity C(Q) of the transceiver system 100 under the TAS/MRC scheme may be approximated to Equation (8), and an expected value $\mu_C$ and variance $\sigma_C^2$ of the channel capacity may be approximated to Equations (9) and (10), respectively.

$$C(Q) \approx \log_2 e \cdot \left[\ln(1+\mu_Q) + \frac{(Q-\mu_Q)}{(1+\mu_Q)} - \frac{(Q-\mu_Q)^2}{2(1+\mu_Q)^2}\right] \quad (8)$$

$$\mu_C \approx \log_2 e \cdot \left[\ln(1+\mu_Q) - \frac{\sigma_Q^2}{2(1+\mu_Q)^2}\right] \quad (9)$$

$$\sigma_C^2 \approx \log_2^2 e \cdot \left[\frac{\sigma_Q^2}{(1+\mu_Q)^2} - \frac{\sigma_Q^4}{4(1+\mu_Q)^4}\right] \quad (10)$$

Figure 5:
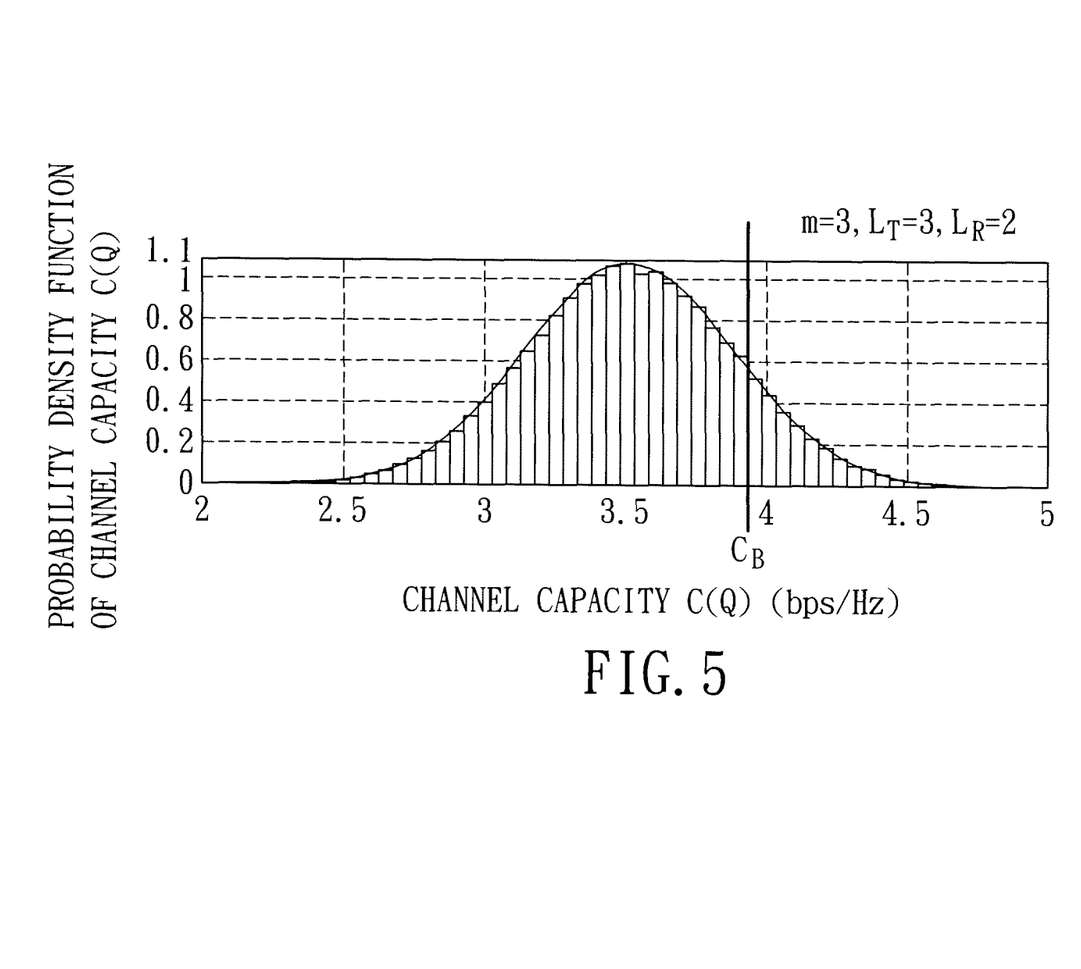
FIG. 5 is a plot to illustrate simulation results of outage capacities compared with Gaussian probability density function.

Further, according to the central limit theorem, values of the PDF of the channel capacity C(Q) may be approximated to Gaussian distribution. Regarding m=3, $L_T$=3, and $L_R$=2, Gaussian distribution is indicated by a solid line in FIG. 5, and the values of the PDF of the channel capacity C(Q) are indicated by the bars in FIG. 5. Therefore, based upon Gaussian function, the PDF of the channel capacity C(Q) can be expressed as Equation (11).

$$p[C(Q)] \approx \frac{1}{\sqrt{2\pi}\,\sigma_C} \exp\left\{-\frac{[C(Q)-\mu_C]^2}{2\sigma_C^2}\right\} \quad (11)$$

Moreover, with reference to "Outage capacity analysis of multiuser diversity in MIMO antenna selection systems" proposed by X. Zhang et al., the maximum channel capacity $C_B$ (i.e., the outage capacity) of the transceiver system 100 with a guaranteed transmission rate (100−B) % (i.e., the outage rate is B %, B being a transmission outage parameter associated with the guaranteed transmission rate) can be expressed as Equation (12).

$$C_B = \mu_C + \sigma_C \sqrt{2}\, \text{erfc}^{-1}(2-B/50) \approx \quad (12)$$

$$\log_2 e \cdot \left\{\left[\ln(1+\mu_Q) - \frac{\sigma_Q^2}{2(1+\mu_Q)^2}\right] + \frac{\sqrt{2}\,\sigma_Q}{1+\mu_Q}\sqrt{1-\frac{\sigma_Q^2}{4(1+\mu_Q)^2}}\, \text{erfc}^{-1}(2-B/50)\right\}$$

In Equation (12), $\text{erfc}^{-1}(x)$ is an inverse function of a complementary error function erfc(x)=1−erf(x), and erf(x) is an error function, $$\text{erf}(x) = \frac{2}{\sqrt{\pi}} \int_0^x e^{-t^2}\,dt.$$

The guaranteed transmission rate (100−B) % is defined as a ratio of a summation of values of the PDF of the channel capacity 0 to $C_B$ to a summation of values of the PDF of the channel capacity 0 to ∞.

From Equations (4) to (7) and (12), the outage capacity (i.e., the maximum channel capacity $C_B$) of the transceiver system 100 under the TAS/MRC scheme can be obtained.

Figure 6:
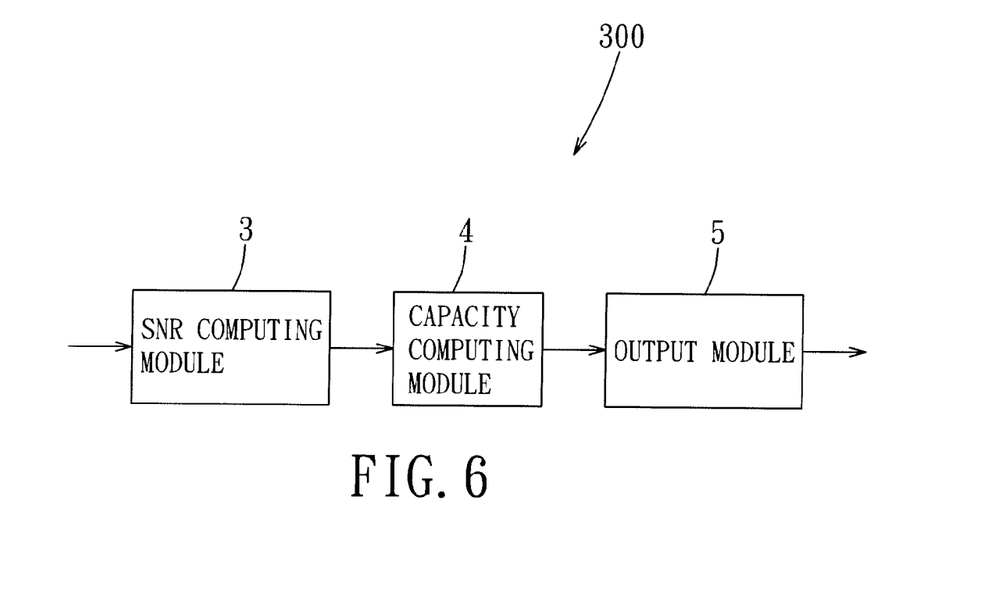
FIG. 6 is a block diagram of the evaluation device of the preferred embodiment.

Referring to FIGS. 3 and 6, the preferred embodiment of an evaluation device 300 of this invention is adapted for analyzing the synthesized signal from the synthesis unit 21 so as to provide the transceiver system 100 with performance information of the transceiver system 100. The transceiver system 100 models the channels between the transmitter 1 and the receiver 2 using Nakagami distribution with the fading parameter m. It is assumed that each of the channels has the same average SNR $\overline{Q}$.

The evaluation device 300 includes an SNR computing module 3, a capacity computing module 4 coupled to the SNR computing module 3, and an output module 5 coupled to the capacity computing module 4. The SNR computing module 3 is operable to set the average SNR $\overline{Q}$ for the channels between the transmitter 1 and the receiver 2, and to compute the expected value $\mu_Q$ and the variance $\sigma_Q^2$ of the effective SNR of the synthesized signal according to the fading parameter m and the average SNR $\overline{Q}$. The capacity computing module 4 is operable to compute the outage capacity $C_B$ of the transceiver system 100 based upon the expected value $\mu_Q$ and the variance $\sigma_Q^2$ of the effective SNR and the transmission outage parameter B associated with the guaranteed transmission rate (100−B) %. The output module 5 is operable to provide the transceiver system 100 with the average SNR $\overline{Q}$ and the outage capacity $C_B$.

Figure 7:
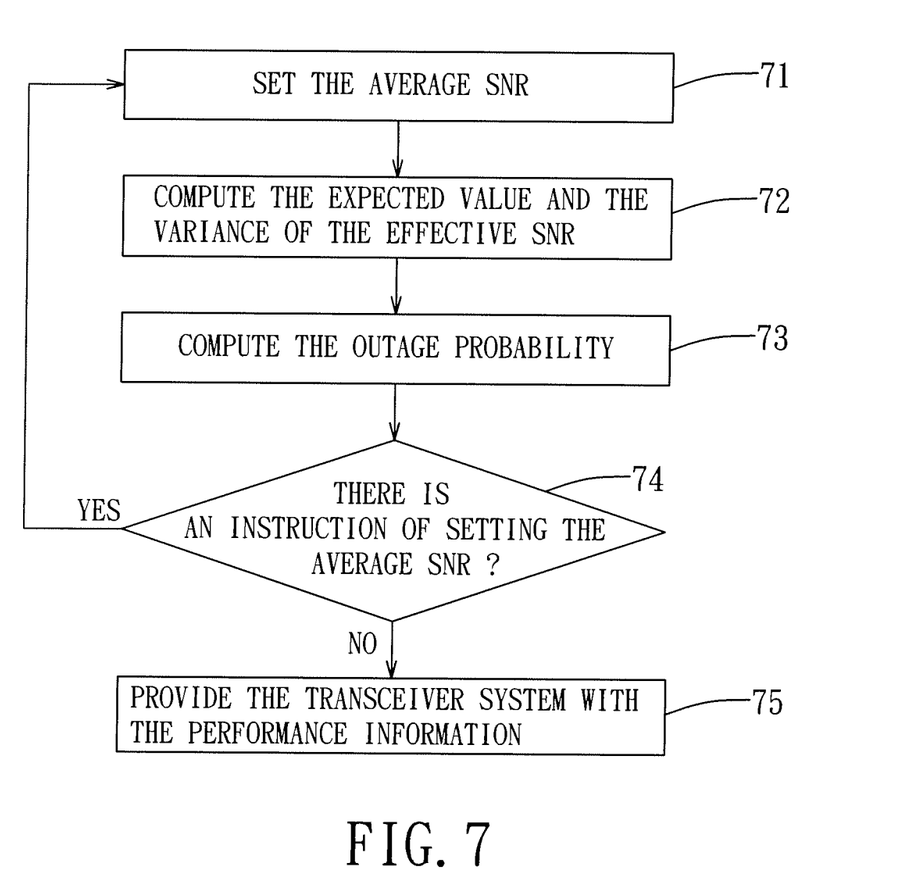
FIG. 7 is a flow chart illustrating the preferred embodiment of an evaluation method of the present invention.

FIG. 7 shows a flow chart of the preferred embodiment of an evaluation method that is to be implemented by the evaluation device 300. The evaluation method includes the following steps.

In step 71, the SNR computing module 3 is operable to set each of the channels with the same average SNR $\overline{Q}$.

In step 72, the SNR computing module 3 is operable to compute the expected value $\mu_Q$ and the variance $\sigma_Q^2$ of the effective SNR according to the fading parameter m and the average SNR $\overline{Q}$.

In practice, the SNR computing module 3 is operable in advance to determine whether the fading parameter m is a positive integer. When the determination is affirmative, the SNR computing module 3 is operable to compute the expected value $\mu_Q$ and the variance $\sigma_Q^2$ of the effective SNR based upon Equations (6) and (7), respectively. When it is determined that the fading parameter m is not a positive integer, the SNR computing module 3 is operable to compute the expected value $\mu_Q$ and the variance $\sigma_Q^2$ of the effective SNR based upon Equations (4) and (5), respectively.

From Equations (4) to (7), it can be appreciated that the SNR computing module 3 computes the expected value $\mu_Q$, and the variance $\sigma_Q^2$ of the effective SNR based upon the average SNR $\overline{Q}$, the fading parameter m, the number $L_T$ of the transmit antennas 12, and the number $L_R$ of the receive antennas 22. Certainly, in other embodiments, the SNR computing module 3 may be operable in advance to determine whether the fading parameter m is greater than or equal to ½, and to compute the expected value $\mu_Q$ and the variance $\sigma_Q^2$ of the effective SNR based upon Equation (4) and (5) when affirmative.

In step 73, the capacity computing module 4 is operable to compute, based upon Equation (12), the outage capacity $C_B$ corresponding to the average SNR $\overline{Q}$ set in step 71.

In step 74, the output module 5 is operable to determine whether there is an instruction of setting another average SNR $\overline{Q}$. The flow goes back step 72 when the determination is affirmative, and goes to step 75 when otherwise.

In step 75, the output module 6 is operable to provide the transceiver system 100 with the outage capacity $C_B$ corresponding to each of the average SNRs $\overline{Q}$ set in step 71 as the performance information of the transceiver system 100.

Figure 8:
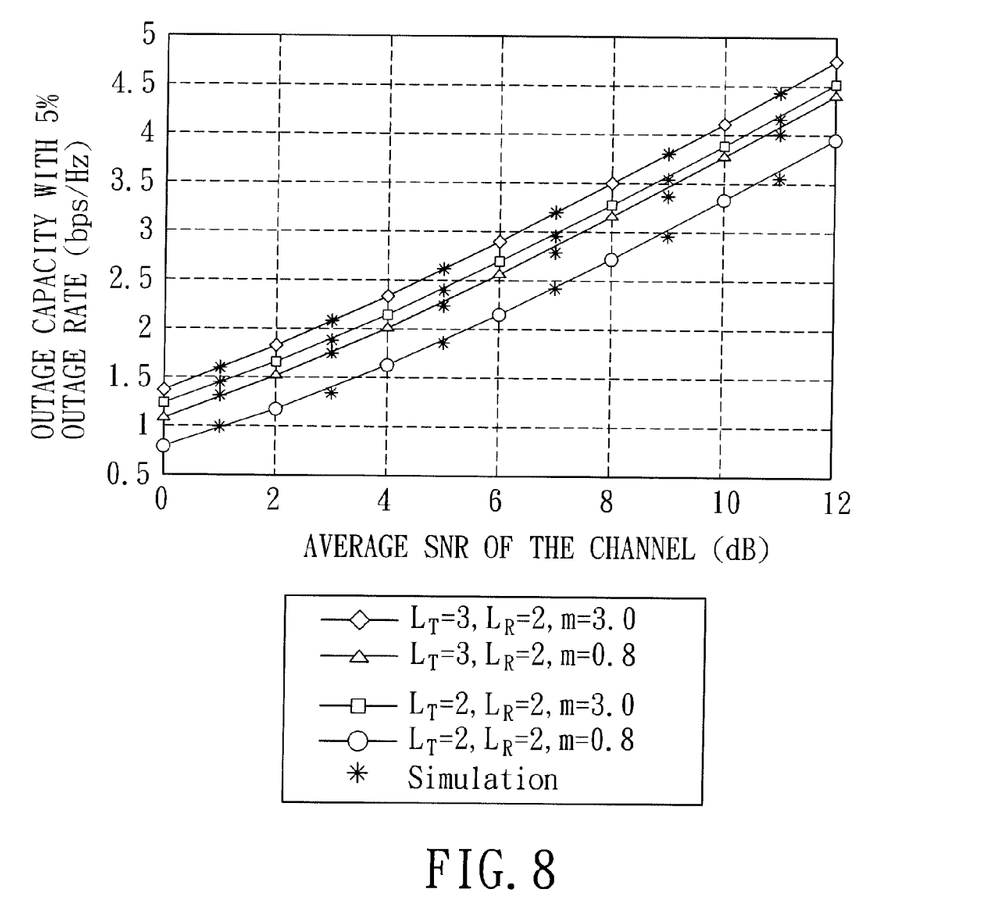
FIG. 8 is a simulation plot for illustrating a relationship between an average signal-to-noise ratio and an outage capacity.

Taking FIG. 8 as an example, for the outage capacity $C_B$ corresponding to 5% outage rate, the symbols ◇ represent the optimal values when $L_T=3$, $L_R=2$ and m=3, the symbols △ represent the optimal values when $L_T=3$, $L_R=2$ and m=0.8, the symbols □ represent the optimal values when $L_T=2$, $L_R=2$ and m=3, and the symbols ○ represent the optimal values when $L_T=2$, $L_R=2$ and m=0.8. The symbols * represent the simulation values of the outage capacity $C_B$ obtained using the evaluation device 300 of this embodiment.

From FIG. 8, it could be noted that the simulation values of the outage capacity $C_B$ computed according to Equation (12) are considerably approximate to the optimal values. Further, the outage capacities $C_B$ increase with the average SNRs $\overline{Q}$, that is to say, the transceiver system 100 allows a relatively greater transmission capacity and the performance thereof is relatively better.

In this embodiment, the fading parameter m of Nakagami channels is not limited to a positive integer. The SNR computing module 3 is capable of computing the expected value $\mu_Q$ and the variance $\sigma_Q^2$ of the effective SNR with the fading parameter m that is an arbitrary positive integer, or that is equal to or greater than ½. Therefore, the evaluation device 300 according to this invention is suitable for simulation of the channels of the transceiver system 100 with various fading levels in a metropolis.

It should be noted that, in other embodiments, the transmitter 1 may include only one transmit antenna 12. Thus, the diversity unit 11 could be omitted, and the transmitter 1 is operable to transmit signals through the sole transmit antenna 12. Further, the receiver 2 may also include only one receive antenna 22. Thus, the synthesis unit 21 could be omitted, and the evaluation device 300 directly analyzes the signal received from the sole receive antenna 22.

In conclusion, the evaluation device 300 according to the present invention is capable of computing the outage capacity $C_B$ corresponding to a particular outage rate once the expected value $\mu_Q$ and the variance $\sigma_Q^2$ of the effective SNR are obtained. Therefore, the evaluation device 300 according to this invention is suitable for simulating the performance of the transceiver system 100 in a metropolis.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An evaluation device adapted for providing a transceiver system with performance information thereof, the transceiver system including a transmitter and a receiver, and modeling a channel between the transmitter and the receiver using Nakagami distribution with a fading parameter, the transmitter including a number $L_T$ of transmit antennas, the receiver including a number $L_R$ of receive antennas, said evaluation device comprising:

a signal-to-noise ratio (SNR) computing module operable to set an average SNR for the channel between the transmitter and the receiver of the transceiver system, and to compute an expected value and variance of an effective SNR of the transceiver system based upon the fading parameter, the average SNR, the number of the transmit antennas, and the number of the receive antennas;

a capacity computing module operable to compute an outage capacity of the transceiver system based upon the expected value and the variance of the effective SNR and a transmission outage parameter associated with a guaranteed transmission rate; and an output module operable to provide the transceiver system with the average SNR and the outage capacity as the performance information of the transceiver system;

wherein, when the fading parameter m is greater than or equal to ½, said SNR computing module is operable to compute the expected value $\mu_Q$ and the variance $\sigma_Q^2$ of the effective SNR based upon $$\mu_Q = \frac{(\overline{Q}/m)}{[\Gamma(mL_R)]^{L_T}} \sum_{n=0}^{\infty} \alpha_n \frac{\Gamma(mL_R L_T + n + 1)}{L_T^{mL_R L_T + n}}, \text{ and}$$

$$\sigma_Q^2 = \frac{(\overline{Q}/m)^2}{[\Gamma(mL_R)]^{L_T}} \sum_{n=0}^{\infty} \alpha_n \frac{\Gamma(n + mL_R L_T + 2)}{L_T^{n+mL_R L_T + 1}} - \left[ \frac{(\overline{Q}/m)}{[\Gamma(mL_R)]^{L_T}} \sum_{n=0}^{\infty} \alpha_n \frac{\Gamma(mL_R L_T + n + 1)}{L_T^{mL_R L_T + n}} \right]^2,$$

where $\overline{Q}$ is the average SNR, $\Gamma(z) = \int_0^{\infty} t^{z-1} e^{-t} dt$ for an arbitrary positive number z, $$\alpha_0 = \left(\frac{1}{mL_R}\right)^{L_T - 1}, \text{ and}$$

$$\alpha_n = \frac{\Gamma(mL_R + 1)}{n} \sum_{j=1}^{n} \frac{jL_T - n}{\Gamma(mL_R + 1 + j)} \alpha_{n-j}$$

for a positive integer n.

2. The evaluation device as claimed in claim 1, wherein said capacity computing module is operable to compute the outage capacity $C_B$ of the transceiver system based upon $$C_B \approx \log_2 e \cdot \left\{ \left[ \ln(1 + \mu_Q) - \frac{\sigma_Q^2}{2(1 + \mu_Q)^2} \right] + \frac{\sqrt{2} \sigma_Q}{1 + \mu_Q} \sqrt{1 - \frac{\sigma_Q^2}{4(1 + \mu_Q)^2}} \, \text{erfc}^{-1}(2 - B/50) \right\}$$

where (100−B) % is the guaranteed transmission rate, B is the transmission outage parameter, and $\text{erfc}^{-1}(\ )$ is an inverse function of a complementary error function erfc( ).

3. The evaluation device as claimed in claim 1, the transmitter including a number $L_T$ of the transmit antennas, and the receiver including a number $L_R$ of the receive antennas, wherein when the fading parameter m is a positive integer, said SNR computing module is operable to compute the expected value $\mu_Q$ and the variance $\sigma_Q^2$ of the effective SNR based upon $$\mu_Q = \frac{L_T(\overline{Q}/m)}{\Gamma(mL_R)} \sum_{j=0}^{L_T-1} \left[ \binom{L_T-1}{j} (-1)^j \sum_{n=0}^{j(mL_R-1)} \beta_n \frac{\Gamma(mL_R+n+1)}{(j+1)^{mL_R+n+1}} \right], \text{ and}$$

$$\sigma_Q^2 = \frac{L_T(\overline{Q}/m)^2}{\Gamma(mL_R)} \sum_{j=0}^{L_T-1} \left[ \binom{L_T-1}{j} (-1)^j \sum_{n=0}^{j(mL_R-1)} \beta_n \frac{\Gamma(mL_R+n+2)}{(j+1)^{mL_R+n+2}} \right] -$$

$$\left\{ \frac{L_T(\overline{Q}/m)}{\Gamma(mL_R)} \sum_{j=0}^{L_T-1} \left[ \binom{L_T-1}{j} (-1)^j \sum_{n=0}^{j(mL_R-1)} \beta_n \frac{\Gamma(mL_R+n+1)}{(j+1)^{mL_R+n+1}} \right] \right\}^2,$$

where $\overline{Q}$ is the average SNR, $\Gamma(z) = \int_0^\infty t^{z-1} e^{-t} dt$ for an arbitrary positive number z, $$\binom{L_T-1}{j} = \frac{(L_T-1)!}{j!(L_T-j-1)!},$$

$\beta_0 = 1$, and $$\beta_t = \frac{1}{t} \sum_{k=1}^{\min(t, mL_R-1)} \frac{k(j+1)-t}{k!} \beta_{t-k}$$

for a positive integer t.

4. The evaluation device as claimed in claim 3, wherein said capacity computing module is operable to compute the outage capacity $C_B$ of the transceiver system based upon $$C_B \approx \log_2 e \cdot \left\{ \left[ \ln(1+\mu_Q) - \frac{\sigma_Q^2}{2(1+\mu_Q)^2} \right] + \frac{\sqrt{2} \sigma_Q}{1+\mu_Q} \sqrt{1 - \frac{\sigma_Q^2}{4(1+\mu_Q)^2}} \, \text{erfc}^{-1}(2-B/50) \right\}$$

where $(100-B)\%$ is the guaranteed transmission rate, B is the transmission outage parameter, and $\text{erfc}^{-1}(\,)$ is an inverse function of a complementary error function $\text{erfc}(\,)$.

5. An evaluation method for providing a transceiver system with performance information thereof, the transceiver system including a transmitter and a receiver, and modeling a channel between the transmitter and the receiver using Nakagami distribution with a fading parameter, the transmitter including a number $L_T$ of the transmit antennas, the receiver including a number $L_R$ of the receive antennas, said evaluation method being adapted to be implemented by an evaluation device and comprising the steps of:

a) configuring the evaluation device to set an average SNR for the channel between the transmitter and the receiver of the transceiver system;

b) configuring the evaluation device to compute an expected value and variance of an effective SNR of the transceiver system based upon the fading parameter, the average SNR, the number of the transmit antennas, and the number of the receive antennas;

c) configuring the evaluation device to compute an outage capacity of the transceiver system based upon the expected value and the variance of the effective SNR and a transmission outage parameter associated with a guaranteed transmission rate; and d) configuring the evaluation device to provide the transceiver system with the average SNR and the outage capacity as the performance information of the transceiver system;

wherein, in step b), when the fading parameter m is greater than or equal to ½, the evaluation device is configured to compute the expected value $\mu_Q$ and the variance $\sigma_Q^2$ of the effective SNR based upon $$\mu_Q = \frac{(\overline{Q}/m)}{[\Gamma(mL_R)]^{L_T}} \sum_{n=0}^{\infty} \alpha_n \frac{\Gamma(mL_R L_T + n + 1)}{L_T^{mL_R L_T + n}}, \text{ and}$$

$$\sigma_Q^2 = \frac{(\overline{Q}/m)^2}{[\Gamma(mL_R)]^{L_T}} \sum_{n=0}^{\infty} \alpha_n \frac{\Gamma(n + mL_R L_T + 2)}{L_T^{n+mL_R L_T + 1}} - \left[ \frac{(\overline{Q}/m)}{[\Gamma(mL_R)]^{L_T}} \sum_{n=0}^{\infty} \alpha_n \frac{\Gamma(mL_R L_T + n + 1)}{L_T^{mL_R L_T + n}} \right]^2,$$

where $\overline{Q}$ is the average SNR, $\Gamma(z) = \int_0^\infty t^{z-1} e^{-t} dt$ for an arbitrary positive number z, $$\alpha_0 = \left( \frac{1}{mL_R} \right)^{L_T-1}, \text{ and}$$

$$\alpha_n = \frac{\Gamma(mL_R+1)}{n} \sum_{j=1}^{n} \frac{jL_T - n}{\Gamma(mL_R+1+j)} \alpha_{n-j}$$

for a positive integer n.

6. The evaluation method as claimed in claim 5, wherein, in step c), the evaluation device is configured to compute the outage capacity $C_B$ of the transceiver system based upon $$C_B \approx \log_2 e \cdot \left\{ \left[ \ln(1+\mu_Q) - \frac{\sigma_Q^2}{2(1+\mu_Q)^2} \right] + \frac{\sqrt{2} \sigma_Q}{1+\mu_Q} \sqrt{1 - \frac{\sigma_Q^2}{4(1+\mu_Q)^2}} \, \text{erfc}^{-1}(2-B/50) \right\}$$

where $(100-B)\%$ is the guaranteed transmission rate, B is the transmission outage parameter, and $\text{erfc}^{-1}(\,)$ is an inverse function of a complementary error function $\text{erfc}(\,)$.

7. The evaluation method as claimed in claim 5, the transmitter including a number $L_T$ of the transmit antennas, and the receiver including a number $L_R$ of the receive antennas, wherein in step b), when the fading parameter m is a positive integer, the evaluation device is configured to compute the expected value $\mu_Q$ and the variance $\sigma_Q^2$ of the effective SNR based upon $$\mu_Q = \frac{L_T(\overline{Q}/m)}{\Gamma(mL_R)} \sum_{j=0}^{L_T-1} \left[ \binom{L_T-1}{j} (-1)^j \sum_{n=0}^{j(mL_R-1)} \beta_n \frac{\Gamma(mL_R+n+1)}{(j+1)^{mL_R+n+1}} \right], \text{ and}$$

-continued $$\sigma_Q^2 = \frac{L_T(\overline{Q}/m)^2}{\Gamma(mL_R)} \sum_{j=0}^{L_T-1} \left[ \binom{L_T-1}{j}(-1)^j \sum_{n=0}^{j(mL_R-1)} \beta_n \frac{\Gamma(mL_R+n+2)}{(j+1)^{mL_R+n+2}} \right] - \left\{ \frac{L_T(\overline{Q}/m)}{\Gamma(mL_R)} \sum_{j=0}^{L_T-1} \left[ \binom{L_T-1}{j}(-1)^j \sum_{n=0}^{j(mL_R-1)} \beta_n \frac{\Gamma(mL_R+n+1)}{(j+1)^{mL_R+n+1}} \right] \right\}^2,$$

where $\overline{Q}$ is the average SNR, $\Gamma(z)=\int_0^\infty t^{z-1}e^{-t}dt$ for an arbitrary positive number z, $$\binom{L_T-1}{j} = \frac{(L_T-1)!}{j!(L_T-j-1)!},$$

$\beta_0 = 1$, and $$\beta_t = \frac{1}{t} \sum_{k=1}^{\min(t,mL_R-1)} \frac{k(j+1)-t}{k!} \beta_{t-k}$$

for a positive integer t.

8. The evaluation method as claimed in claim 7, wherein, in step c), the evaluation device is configured to compute the outage capacity $C_B$ of the transceiver system based upon $$C_B \approx \log_2 e \cdot \left\{ \left[ \ln(1+\mu_Q) - \frac{\sigma_Q^2}{2(1+\mu_Q)^2} \right] + \frac{\sqrt{2}\,\sigma_Q}{1+\mu_Q} \sqrt{1 - \frac{\sigma_Q^2}{4(1+\mu_Q)^2}}\, \mathrm{erfc}^{-1}(2-B/50) \right\}$$

where (100−B) % is the guaranteed transmission rate, B is the transmission outage parameter, and $\mathrm{erfc}^{-1}(\ )$ is an inverse function of a complementary error function $\mathrm{erfc}(\ )$.

9. The evaluation method as claimed in claim 5, further comprising a step of repeating steps a) to c) using another average SNR, wherein
in step d), the evaluation device is configured to provide the transceiver system with the average SNRs set in step a) and the respective outage capacities obtained in step c) as the performance information of the transceiver system.

10. An evaluation method for providing a transceiver system with performance information thereof, the transceiver system including a transmitter and a receiver, and modeling a channel between the transmitter and the receiver using Nakagami distribution with a fading parameter, the transmitter including a number $L_T$ of the transmit antennas, the receiver including a number $L_R$ of the receive antennas, said evaluation method being adapted to be implemented by an evaluation device and comprising the steps of:
i) configuring the evaluation device to set an average SNR for the channel between the transmitter and the receiver of the transceiver system;
ii) configuring the evaluation device to compute an expected value and variance of an effective SNR of the transceiver system based upon the fading parameter, the average SNR, the number of the transmit antennas, and the number of the receive antennas;
iii) configuring the evaluation device to compute an outage capacity of the transceiver system based upon the expected value and the variance of the effective SNR and a transmission outage parameter associated with a guaranteed transmission rate; and
iv) configuring the evaluation device to provide the transceiver system with the average SNR and the outage capacity as the performance information of the transceiver system;

wherein, in step ii), when the fading parameter m is a positive integer, the evaluation device is configured to compute the expected value $\mu_Q$ and the variance $\sigma_Q^2$ of the effective SNR based upon $$\mu_Q = \frac{L_T(\overline{Q}/m)}{\Gamma(mL_R)} \sum_{j=0}^{L_T-1} \left[ \binom{L_T-1}{j}(-1)^j \sum_{n=0}^{j(mL_R-1)} \beta_n \frac{\Gamma(mL_R+n+1)}{(j+1)^{mL_R+n+1}} \right], \text{ and}$$

$$\sigma_Q^2 = \frac{L_T(\overline{Q}/m)^2}{\Gamma(mL_R)} \sum_{j=0}^{L_T-1} \left[ \binom{L_T-1}{j}(-1)^j \sum_{n=0}^{j(mL_R-1)} \beta_n \frac{\Gamma(mL_R+n+2)}{(j+1)^{mL_R+n+2}} \right] - \left\{ \frac{L_T(\overline{Q}/m)}{\Gamma(mL_R)} \sum_{j=0}^{L_T-1} \left[ \binom{L_T-1}{j}(-1)^j \sum_{n=0}^{j(mL_R-1)} \beta_n \frac{\Gamma(mL_R+n+1)}{(j+1)^{mL_R+n+1}} \right] \right\}^2,$$

where $\overline{Q}$ is the average SNR, $\Gamma(z)=\int_0^\infty t^{z-1}e^{-t}dt$ for an arbitrary positive number z, $$\binom{L_T-1}{j} = \frac{(L_T-1)!}{j!(L_T-j-1)!},$$

$\beta_0 = 1$, and $$\beta_t = \frac{1}{t} \sum_{k=1}^{\min(t,mL_R-1)} \frac{k(j+1)-t}{k!} \beta_{t-k}$$

for a positive integer t.

11. The evaluation method as claimed in claim 10, wherein, in step c), the evaluation device is configured to compute the outage capacity $C_B$ of the transceiver system based upon $$C_B \approx \log_2 e \cdot \left\{ \left[ \ln(1+\mu_Q) - \frac{\sigma_Q^2}{2(1+\mu_Q)^2} \right] + \frac{\sqrt{2}\,\sigma_Q}{1+\mu_Q} \sqrt{1 - \frac{\sigma_Q^2}{4(1+\mu_Q)^2}}\, \mathrm{erfc}^{-1}(2-B/50) \right\}$$

where (100−B) % is the guaranteed transmission rate, B is the transmission outage parameter, and $\mathrm{erfc}^{-1}(\ )$ is an inverse function of a complementary error function $\mathrm{erfc}(\ )$.

12. The evaluation method as claimed in claim 10, further comprising a step of repeating steps i) to iii) using another average SNR, wherein
in step iv), the evaluation device is configured to provide the transceiver system with the average SNRs set in step i) and the respective outage capacities obtained in step iii) as the performance information of the transceiver system.

* * * * *